United States Patent [19]

Domesle et al.

[11] Patent Number: 5,157,007
[45] Date of Patent: Oct. 20, 1992

[54] CATALYST FOR PURIFICATION OF EXHAUST GASES OF DIESEL ENGINES AND METHOD OF USE

[75] Inventors: Rainer Domesle, Alzenau-Kaelberau; Bernd Engler, Hanau; Edgar Koberstein, Alzenau; Herbert Voelker, Zeiskam, all of Fed. Rep. of Germany

[73] Assignee: Degussa AG, Frankfurt am Main, Fed. Rep. of Germany

[21] Appl. No.: 667,211

[22] Filed: Mar. 11, 1991

Related U.S. Application Data

[63] Continuation-in-part of Ser. No. 616,349, Nov. 21, 1990, abandoned.

[30] Foreign Application Priority Data

Dec. 9, 1989 [DE] Fed. Rep. of Germany ....... 3940758

[51] Int. Cl.$^5$ ................. B01J 29/04; B01J 23/22; B01J 23/40
[52] U.S. Cl. ................. 502/66; 502/74; 502/247; 502/325; 502/353
[58] Field of Search ................. 423/213.5; 502/66, 74, 502/247, 353, 325, 350, 354

[56] References Cited

U.S. PATENT DOCUMENTS

| | | | |
|---|---|---|---|
| 3,864,451 | 2/1975 | Lee et al. | 423/213.5 |
| 4,455,393 | 6/1984 | Domesle et al. | 502/347 |
| 4,477,417 | 10/1984 | Domesle et al. | 423/213.2 |
| 4,515,758 | 5/1985 | Domesle et al. | 423/213.2 |
| 4,588,707 | 5/1986 | Domesle et al. | 502/225 |
| 4,759,918 | 7/1988 | Homeier et al. | 423/213.5 |
| 4,828,807 | 5/1989 | Domesle et al. | 423/213.5 |
| 4,900,517 | 2/1990 | Domesle et al. | 422/171 |

FOREIGN PATENT DOCUMENTS

| | | | |
|---|---|---|---|
| 0174495 | 3/1986 | European Pat. Off. | |
| 0211233 | 2/1987 | European Pat. Off. | |
| 13816 | 2/1979 | Japan | 423/213.5 |
| 60-266145 | 11/1985 | Japan | |
| 61-34972 | 2/1986 | Japan | |

*Primary Examiner*—Carl F. Dees
*Attorney, Agent, or Firm*—Beveridge, DeGrandi & Weilacher

[57] ABSTRACT

An open-cell, monolithic catalyst for the purification of diesel-engine exhaust gas with a coating of finely divided inorganic oxides containing vanadium and platinum group metal as active components. The active components of the oxidic coating are added as water-soluble precursors which are then converted by means of tempering, preferably in an atmosphere of hydrogen, into the active component.

22 Claims, 1 Drawing Sheet

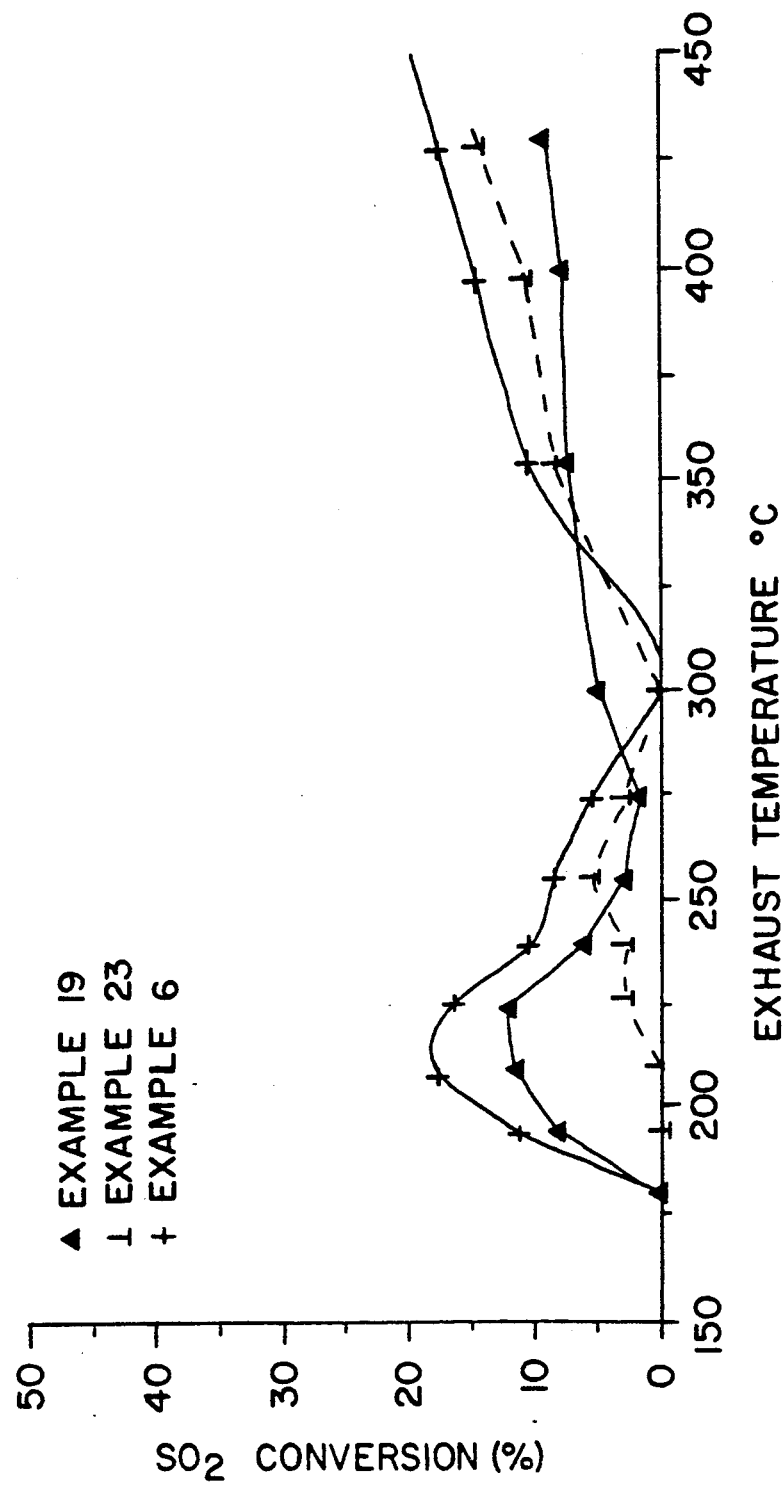

5,157,007

CATALYST FOR PURIFICATION OF EXHAUST GASES OF DIESEL ENGINES AND METHOD OF USE

RELATED APPLICATION DATA

This application is a continuation-in-part of U.S. patent application Ser. No. 07/616,349, filed Nov. 21, 1990 and now abandoned, which application is incorporated herein by reference.

BACKGROUND OF THE INVENTION

The present invention relates to a catalyst capable of operating in a continuous manner without requiring a cyclical removal of separated soot particles (particulates), the catalyst being used for the oxidative purification of the exhaust gases of diesel engines. High conversion performance for hydrocarbons and carbon monoxide in low operating temperature ranges is obtained by the present invention. The catalysts of the invention feature vanadium compounds and platinum group metals deposited onto finely divided aluminum oxide, titanium oxide, silicon oxide, zeolite, as well as their mixtures, as activity-enhancing support materials. The present invention also relates to the method of purifying diesel exhaust gases.

Filters based on fine-pore ceramic monoliths with alternatingly plugged channels (so-called wall flow filters), ceramic foams, wire mesh packets, ceramic tubes, ceramic fiber wound filters, and the like have already been suggested for the purification of diesel exhaust gases containing sulfur oxide and nitrogen oxide. The diesel soot particles can be removed from the exhaust-gas current with the aid of these filtration devices. However, the particles filtered therefrom can only be removed by combustion in a few operational states during which the exhaust-gas temperature is sufficiently high enough. The known diesel soot filters have to be regenerated in this manner.

However, if such a specified driving state, during which the particulates can be burned off, does not occur for a rather long driving period, due to, for example, a moderate mode of driving, the exhaust-gas backpressure of the filter rises as a result of the constant accumulation of particulates and the accompanying consumption of fuel. As a result, the engine finally comes to a standstill. Thus, these known filter systems do not have a sufficient operational reliability for general use in solving the problem of reducing diesel particulate emissions. Therefore, it has been frequently suggested that burner systems be used in diesel systems for regeneration or that an external regeneration be performed by means of heating the filters with electric current, for example, when the vehicle is at a standstill. However, there are problems with such systems. In the first system, a burner system can be housed with ease only in the case of large emission sources, such as trucks; and for the other system, an external regeneration system for heating the filter is complicated.

It is already known that various types of filter systems, including the above-described wall flow filter, may be coated with catalytic substances which lower the ignition temperature. Such catalytic substances include vanadium pentoxide, vanadates, e.g. $AgVO_3$ and perrhenates. These active substances can be doped with a finely divided support material and, in addition, a noble metal such as platinum can also be added by impregnation (U.S. Pat. No. 4,515,758; U.S. Pat. No. 4,477,417; U.S. Pat. No. 4,588,707; U.S. Pat. No. 4,455,393; U.S. Pat. No. 4,828,807 and U.S. Pat. No. 4,900,517).

It has been observed, however, that the conversion performance for hydrocarbons and carbon monoxide, especially in the case of the low exhaust-gas temperatures specific to diesel engines, is not satisfactory in the case of the wall flow filters primarily used at the present, even if they are coated with catalysts of the above-mentioned type. Moreover, the use of wall flow filters coated with catalytic materials and carrier materials leads to the disadvantage of a high exhaust-gas backpressure, which adversely affects the engine performance, especially when highly charged with soot particles. Efforts to compensate this disadvantage by means of a greater amount of catalyst were not successful. Moreover, an enlargement of the geometric dimensions of catalysts, which could result in a reduction of the exhaust-gas backpressure, is not feasible because of the limited space availability in most vehicles.

The invention therefore has one objective of developing a system with which the disadvantages pointed out can be overcome.

SUMMARY OF THE INVENTION

An object of the present invention is to provide a catalyst capable of operating in a continuous manner without requiring particulate separation from the exhaust gas stream and without cyclical cleaning. The catalyst is suitable for the oxidative purification of the exhaust gases of diesel engines with a high conversion performance for hydrocarbons and carbon monoxide at low temperatures and inhibited oxidation action with respect to NO and $SO_2$.

These and other objects can be achieved by employing vanadium compounds and platinum group metals as active components which are deposited onto finely divided aluminum oxide, titanium oxide, silica, zeolite as well as mixtures thereof as activity-enhancing support materials.

A feature of the catalyst of the invention resides in that the catalytically active component is present as platinum, palladium, rhodium and/or iridium and is doped with vanadium or is in contact with an oxidic vanadium compound. All catalytic components are deposited on the channels of a monolithic or honey-combed inert carrier made of ceramic or metal. The exhaust gas flows freely through the channels of the inert carrier.

The catalysts of the invention are obtainable by means of the impregnation of the activity-enhancing support material with a solution of one or more compounds of the platinum group metals and a solution of one or more vanadium compounds. The impregnation step can take place simultaneously or successively in any desired sequence. After impregnation, drying, as well as optionally calcining can take place at temperatures of at least 200° C., preferably in a current of a gas containing hydrogen. The step of depositing the catalytically active noble metal and vanadium compound takes place by impregnation of the activity enhancing support material with at least one of the two initial materials for the formation of the catalytically active component. This impregnation takes place either after or before the application of the activity-enhancing support material onto the inert carrier.

There is, therefore, great latitude in the manufacture of the catalysts in accordance with the invention. Thus, an inert ceramic or metal carrier can be coated with the activity-enhancing, oxidic support material by immersion or otherwise depositing according to the method of dispersion coating. Then, the inert carrier coated with the oxide film can be impregnated simultaneously or successively with the solutions of the precursors for the formation of the catalytically active component; i.e. vanadium and platinum group metal. In the first instance, either the solutions of the two precursors are mixed together or a uniform solution of the precursors is prepared.

However, the inert ceramic or metal carrier can also be provided according to the dispersion-coating method with a film of support material already containing one or both precursors of the catalytically active component. This can be carried out either by means of impregnating the support material with the solution or solutions of the particular precursor(s) of the vanadium and platinum group metal component before the preparation of the coating suspension or by means of charging the precursor solution(s) into the previously prepared coating suspension, during which the precursors are absorbed onto the suspended support material. If only one of the two precursors is applied in this way together with the support material, then the other precursor is added by means of a subsequent impregnation of the coated inert ceramic or metal carrier.

After each impregnating or coating step, the particular substrate present can be subjected to a drying and/or the calcination, which preferably takes place under an atmosphere of hydrogen, for example, in order to fixedly deposit the support material onto the inert carrier or to fix one or both precursors on the activity-enhancing support material and to form the catalytically active component(s) from the precursors. After both the vanadium and platinum group metal precursors are present on the support material, the process can be limited to only a drying step, if the calcination for forming the active component is to be left to a reaction when the catalyst is loaded in the vehicle and the engine is producing hot engine exhaust gas. Otherwise, the calcination must be carried out in an oven in order to obtain the catalytically active component.

All water-soluble or partially water-soluble vanadium compounds are suitable as precursors for the vanadium doping. Examples of precursors are such organic compounds as vanadyl oxalate and vanadyl formiate, as well as inorganic compounds; e.g. $KVO_3$, $NaVO_3$, $NH_4VO_3$, $V_2O_5$.

All customary salts and complex salts of the same are suitable as precursors for the platinum group metals. Examples are $H_2PtCl_6$, $Pt(NH_3)_4(OH)_2$, $Pt(NH_3)_2(NO_2)_2$, $Pt(NH_3)_4(NO_3)_2$, platinum nitrate, $PdCl_2$, $Pd(NO_3)_2$, $Pd(NH_3)_2(NO_2)_2$, $Pd(NH_3)_4(OH)_2$, $H_3RhCl_6$, $Rh(NO_3)_3$, $H_2IrCl_6$. These are the typical inorganic salts suitable for purposes of the invention as are well known in the art.

Aqueous systems are generally used for the impregnations carried out in accordance with the invention.

The invention is especially useful for the purification of exhaust gas from diesel engines of a modern design in which the particulate component of carbon (C) of the particulates relative to the component of extractable and evaporable (and recondensable) hydrocarbons of the particulates has already been clearly reduced by means of measures taken in the engine and permits the fulfilling of very strict environmental limiting values for particulate emissions.

Surprisingly, the catalyst of the present invention furnishes, in addition to a suitable combustion of the carbon (C) component, a heretofore as yet unachieved degree of conversion both for gaseous pollutants and for pollutants in the form of an aerosol. The conversion of pollutants takes place, in distinction to that observed in the case of wall filters, at considerably lower exhaust-gas temperatures. This effect is especially significant with regard to the odor-forming aldehydes. The latter can be almost completely eliminated with the aid of the catalysts of the invention, even at relatively low exhaust-gas temperatures such as those which occur, for instance, temporarily during the operation of buses in city traffic. The disadvantageous influence of an elevated backpressure and of the elevated fuel consumption associated therewith is eliminated.

The phenomenon of elevated conversion performance in the case of a suitable carbon component combustion could be explained therewith, under the premise of the same cell density, that the molecules and agglomerates passing the long channels of the monolithic or honeycombed catalyst of the invention come in contact considerably more frequently and effectively with the catalytically coated chemical surfaces than is the case with wall flow filters. In the case of wall flow filters, each component of exhaust gas flows at first only once through the catalytically coated, porous wall and thereafter is forced into the middle of the flowoff channels by the threads of stream entering in a given channel through the four adjacent channels. Therefore, the exhaust gas is concentrated and kept from comparably high wall contacts. However, applicants do not wish to be bound by any particular theory of operation.

The present invention has the further advantage that a one to tenfold higher cell density can be used than is the case in wall flow filters, which is associated with a considerable boosting of the catalytically active surface area.

Furthermore, it was found that the catalysts of invention exhibit an especially good light-off performance with regard to the conversion of hydrocarbons and carbon monoxide if they contain a mixture of aluminum oxide with titanium oxide, silica and/or zeolite in a weight ratio between aluminum oxide and the other oxides of 90:10 to 10:90. In this instance, the aluminum oxide and other oxides are present as the finely divided support material for the platinum group metals doped with vanadium or in contact with an oxidic vanadium compound.

One embodiment of the catalyst in accordance with the invention includes an embodiment wherein the activity-enhancing support material includes a finely dispersed support of a mixture of titanium oxide with silicon dioxide in a weight ratio ranging from 95 to 5:5 to 95. More preferably, this weight ratio of titanium dioxide to silicon dioxide is in the range of 75 to 25:25 to 75.

In another embodiment of the invention, the activity-enhancing support material includes a finely dispersed support of a mixture of titanium oxide with zirconium dioxide in a weight ratio ranging rom 95 to 5:5 to 95, and more preferably, in the range of 75 to 25:25 to 75.

It is especially advantageous if the activity-enhancing support material is present in a concentration of 30–250 g/dm³, preferably 75–180 g/dm³, and especially 90–150 g/dm³ catalyst volume, the vanadium, calculated as $V_2O_5$, in a concentration of 0.15–15 g/dm³ catalyst volume and the platinum group metals in a concentration of 0.1–7 g/dm³ catalyst volume.

The appropriate vanadium content is dependent to a limited extent in accordance with the content of the finely divided support material; that is, the more of the latter is present, the more vanadium is added in order to reduce the oxidation of $SO_2$, which is always found in the exhaust gas.

In contrast to wall flow filters, the upper loading capacity of the inert, open-cell carrier for activity-enhancing support material is far higher than in the case of diesel filters, in which a fairly high charging results in an impractical rise of the flow resistance. This technical advantage obtainable in accordance with the invention is expressed in the form of improved pollutant conversions at fairly low temperatures.

The cell density of the monolithic or honeycombed inert carrier is preferably 5 to 100 cells/cm², preferably 20–100 cells/cm², and especially 30–80 cells/cm².

A further significant advantage of the catalysts of the invention is the suppression of the emission of $NO_2$. This component is present only to a secondary degree in the exhaust gas of diesel engines. However, during the passage of exhaust gas over conventional catalysts containing platinum group metals for the purpose of the oxidation of CO and hydrocarbons, significant amounts of nitrogen dioxide are formed from NO and the atmospheric oxygen which is always contained therein in excess. This side reaction is extremely undesirable since the toxicity of $NO_2$ far exceeds that of NO. In contrast thereto, it has been surprisingly determined that the catalytic compositions of the invention consisting of finely divided support materials and vanadium-doped platinum group metals deposited on a monolithic, inert carrier suppress the formation of $NO_2$ to a considerable degree without disadvantageously influencing the desired oxidation reactions.

An especially effective inhibition of the further oxidation of nitrogen monoxide can be achieved when platinum and/or palladium are used as the platinum group metal.

The problem of the further oxidation of NO, which can be controlled by means of the invention, occurs in a serious manner practically only in the case of open-cell monolithic catalysts and honeycomb catalysts. The reason for this lies in the fact that the pollutant conversions are generally considerably higher here in comparison to conventional catalytically coated diesel wall flow filters and comparable conversions take place with the catalysts of the invention at lower temperatures.

Platinum and, in order to achieve only a slight further oxidation of NO (and also of $SO_2$), palladium have proven to be especially advantageous as platinum group metals for achieving an improved durability. The platinum component should be above 50 % by weight relative to the total content of platinum group metal, if fairly small concentrations of platinum group metals are provided (e.g. 0.7 to 1.8 g/dm³).

Since palladium does not convert the pollutants as effectively as platinum in the same weight amounts, it is appropriate when using only palladium to select higher concentrations from the claimed range. This is completely justifiable from an economic standpoint since palladium exhibits distinct cost advantages compared to platinum.

Combinations of platinum and iridium or rhodium also yield good effects. These combinations are more expensive, to be sure, but are preferred in certain instances, e.g. if there is a high component of nitrogen oxide in the exhaust gas.

The finely divided support materials described herein and their mixtures are especially effective. However, the following support substances can be added to them alone or in a mixture: $MgO$, $CeO_2$, $GeO_2$, $SnO_2$, $ZrO_2$, $HfO_2$, $ThO_2$, $Nb_2O_5$, $WO_3$, $MoO_3$, magnesium silicate, aluminum silicate and magnesium titanate.

Of these substances, the acidic oxides are preferred since they accumulate less of any $SO_3$ formed than do basic oxides The latter tend to become charged with $SO_3$, which is associated with a reduction of activity and entails the additional disadvantage of emitting a sulfuric acid fog ($SO_3$+water vapor) at the occurrence of temperature peaks.

Thus, the catalysts of the invention are also distinguished in particular by virtue of the fact that they emit very little sulfur in the oxidation state +6 in spite of the claimed high conversion performance for particulate and volatile pollutants (the latter also include the odor-intensive aldehydes).

To this end, it is especially advantageous if a mixture of aluminum oxide and titanium dioxide, optionally in a mixture with another acidic oxide, in a weight ratio of 10:90 to 70:30, preferably 20:80 to 60:40 is used as the support material.

The advantageous effect of a reduction of the $SO_3$ emission observed previously according to SAE Paper 850013 in diesel filters in accordance with DE-OS 32 32 729 also occurs therewith in the case of the catalysts of the present invention.

BRIEF DESCRIPTION OF THE DRAWING

FIG. 1 shows a comparison of the $SO_2$ to $SO_3$ conversion for various examples in accordance with the invention.

DETAILED DESCRIPTION OF THE INVENTION

The invention is explained further in the following illustrative examples.

EXAMPLE 1

A cylindrical, open-cell honeycomb of cordierite with a diameter of 114 mm, length of 115 mm and a cell density of 62 cells/cm² is coated with $Al_2O_3$ by immersion in a 30% suspension of $Al_2O_3$. After drying at 100° C. and a two-hour tempering at 400° C., 290 g $Al_2O_3$ are present on the carrier. The coated monolith is subsequently impregnated with a solution of $Pt(NH_3)_4(OH)_2$ containing 3.27 g Pt, dried at 120° C. and reduced 2 h at 300° C. in a current of forming gas ($N_2$:$H_2$=95:5). The catalytic precursor is subsequently impregnated with vanadyl oxalate solution containing 9.3 g $V_2O_5$ and dried 2 h at 300° C. under decomposition of the vanadium compound.

REFERENCE EXAMPLE 1

A cylindrical diesel particle filter with alternatingly plugged cells (manufacturer Corning Glass) with a diameter of 144 mm and a length of 115 mm, a cell density of 16 cells/in² and a cell wall thickness of 0.64 mm is impregnated, as described in DE-OS 32 32 729, from the front side with a vanadyl oxalate solution containing 45 g $V_2O_5$. After drying at 150° C., the coated monolith is tempered 1 h at 700° C. during which time vanadyl oxalate decomposes. A coating from the other face side takes place thereafter with a thin suspension of $Al_2O_3$ containing 45 g Al$_2$O$_3$ and a drying at 300° C. A solution of Pt(NH$_3$)$_4$(OH)$_2$ containing 3.27 g Pt is subsequently poured over the filter body from the same side, the filter body is dried and reduced 2 h at 300° C. in a current of forming gas (N$_2$:H$_2$=95:5).

EXAMPLE 2

The diesel exhaust gas purification systems according to Example 1 and Reference Example 1 were tested on a stationary engine test unit equipped with a 4-cylinder diesel engine (55 kW, 1.6 liter piston displacement) and a fluid friction (Eddy) current dynamometer, type 230 of Schenck AG. The test fuel contained 0.2% sulfur.

The following devices were used for the analysis of the exhaust gas:

| | | |
|---|---|---|
| O$_2$ measurement | Oxymat | Siemens AG |
| HC measurement | FID | Pierburg Messtechnik |
| NO, NO$_x$ measurement | model 951 A | Beckman Instruments |
| CO measurement | Binos | Leybold AG |
| CO$_2$ measurement | Binos | Leybold AG |
| SO$_2$ measurement | Binos | Leybold AG. |

The activity test took place on the engine with 2 performance stages; the degree of conversion of HC, CO and SO$_2$ to SO$_3$ was determined according to the formula:

$$K = \frac{\text{inlet concentration} - \text{outlet concentration}}{\text{inlet concentration}} \times 100 = \%$$

In order to regulate the exhaust-gas temperature, a cooler was installed in the exhaust pipe which cooler made possible a continuous increase in the temperature at the filter and catalyst inlet during the test, in conjunction with speed and load change of the engine.

| | Engine settings: | |
|---|---|---|
| Stage | rpm | Load (Newton) | Exhaust-gas temperature °C. |
| 1 | 2100 | 71 | 150–250 |
| 2 | 3000 | 76 | 250–450. |

After the tests in a fresh state, filter and catalyst were aged in the engine without cooling system or 100 h with the following engine setting:

| rpm | Load (Newton) | Exhaust-gas temperature °C. |
|---|---|---|
| 2900 | 76 | 550. |

CO, HC and SO$_2$ conversions were determined in the fresh and in the aged stage via the exhaust-gas entry temperature for the two systems tested with the following results:

| | T$_{50\%}$ (°C.) | |
|---|---|---|
| | CO | HC |
| Fresh state | | |
| Example 1 | 203 | 210 |
| Reference Example 1 | 425 | 262 |
| 100 h engine ageing | | |
| Example 1 | 208 | 225 |
| Reference Example 1 | — | 277. |

A 50% conversion for CO was no longer achieved after engine ageing in the tested temperature range.

Furthermore, the conversions were determined at 250° C., which corresponds to an average exhaust-gas temperature in diesel engines in short-distance operation.

| Fresh state | | | |
|---|---|---|---|
| Example 1 | CO = 92 | HC = 63 | SO$_2$ = 19 |
| Reference Example 1 | CO = 17 | HC = 38 | SO$_2$ = 4 |
| 100 h ageing | | | |
| Example 1 | CO = 82 | HC = 66 | SO$_2$ = 12 |
| Reference Example 1 | CO = 10 | HC = 32 | SO$_2$ = 2. |

The following values for the pressure loss for the exhaust-gas purification systems were determined in the operating state at 520° C. exhaust-gas temperature and 70N load:

| | Fresh state | Engine operation (30 min.: 33 N; 2900 rpms) |
|---|---|---|
| Example 1 | 0.9 kPa | 0.9 kPa |
| Reference Example 1 | 4.2 kPa | 20 kPa. |

In a comparison of the test results, the exhaust-gas purification system of the invention in accordance with Example 1 exhibits the following advantages over reference Example 1 according to the state of the art:

In the critical exhaust-gas temperature range between 150° and 250° C., the degrees of conversion for CO and HC are considerably higher, especially after engine ageing.

The flow resistance is clearly less in the case of the honeycombed catalyst (Example 1) in comparison to the uncharged and especially to the charged filter (Reference Example 1).

EXAMPLES 3–6

A ceramic honeycomb with 102 mm diameter, 114 mm length and a cell density of 62 cells/cm$^2$ is provided with an Al$_2$O$_3$ coating by means of immersion in an aqueous suspension of γ-Al$_2$O$_3$ (specific surface 160 m$^2$/g) and with blowing excess coating material out of the open channels. After drying at 120° C. and tempering at 700° C. in air, the coated shaped body is impregnated with H$_2$PtCl$_6$, dried again at 120° C. and reduced 2 h at 500° C. in a current of forming gas (N$_2$:H$_2$=95:5). The catalyst is subsequently completed by means of an impregnation with an aqueous solution of vanadyl oxalate, drying at 120° C. and decomposition of the vanadyl salt at 350° C. in air. See Table 1 for the catalytic compositions.

REFERENCE EXAMPLE 2

A catalyst is produced in accordance with Example 6 but is not impregnated with vanadyl oxalate.

EXAMPLES 7 and 8

A catalyst is produced according to Example 3 with the difference that Pt(NH$_3$)$_4$(OH)$_2$ is used as noblemetal component and a 2-hour tempering in air at 450° C. takes place instead of the reduction.

EXAMPLE 9

A carrier body (diameter 100 mm, length 18 mm, 62 cells/cm$^2$) of high-temperature-resistant steel comprising Fe, Cr and Al as essential alloy components is coated with an aqueous suspension of $\gamma$-$Al_2O_3$ (specific surface 100 m$^2$/g) and vanadyl oxalate, dried and calcined in air at 400° C. The catalytic precursor is subsequently impregnated with $Pt(NH_3)_4(NO_3)_2$, dried at 120° C. and reduced 1 h in a current of forming gas ($N_2$:$H_2$=95:5) 2 h at 500° C.

EXAMPLES 10 and 11

A ceramic honeycomb as described in Example 3 is coated with an aqueous suspension of $\gamma$-$Al_2O_3$ with a specific surface of 120 m$^2$/g. After drying at 105° C. and a 3-hour tempering at 550° C., the shaped body is impregnated with a solution of vanadyl oxalate, dried at 120° C. and calcined 2 h at 350° C. in air. An impregnation with $H_2PtCl_6$ and $Pd(NO_3)_2$, a drying at 120° C. and a reduction at 450° C. in a current of forming gas take place subsequently.

REFERENCE EXAMPLE 3

A catalyst is produced in accordance with Example 10 without adding vanadyl oxalate to the suspension of $\gamma$-$Al_2O_3$.

EXAMPLE 12

A catalyst in accordance with Example 10 is produced exclusively with Pd as noble-metal component (added as $Pd(NO_3)_2$).

EXAMPLE 13

A catalyst according to Example 10 is produced using the noble metals Pd (added as $PdCl_2$) and Ir (added as $H_2IrCl_6$) in a ratio of 5:1.

EXAMPLE 14

A ceramic honeycomb as described in Example 3 is coated with an aqueous suspension of $\gamma$-$Al_2O_3$ (140 m$^2$/g), $H_2PtCl_6$, $RhCl_3$ and vanadyl oxalate, dried at 120° C. and reduced 2 h in a current of forming gas at 550° C.

EXAMPLE 15

A catalyst is produced according to Example 10 using the noble metal salts $H_2PtCl_6$ and $H_2IrCl_6$.

EXAMPLES 16-19

A ceramic honeycomb as described in Example 3 is coated with an aqueous suspension of $\gamma$-$Al_2O_3$ (180 m$^2$/g) and $TiO_2$ (Degussa P 25, rutile/anatase mixture, 51 m$^2$/g specific surface area). After drying at 120° C. and a 2-hour tempering at 450° C., the coated monolith was impregnated with $Pt(NH_3)_4(OH)_2$. A tempering in air at 300° C. followed the drying at 150° C. After the coating with vanadyl oxalate and drying at 105° C. as well as the decomposition of vanadyl salt at 400° C., the catalytic precursor was reduced 2 h at 500° C. in a current of forming gas.

EXAMPLE 20

A catalyst according to Example 12 is produced with an aqueous suspension containing $\gamma$-$Al_2O_3$ (120 m$^2$/g) and $SiO_2$ (Degussa FK 320, 170 m$^2$/g specific surface area).

EXAMPLE 21

A catalyst according to Example 6 is prepared with an aqueous suspension containing $\gamma$-$Al_2O_3$ (140 m$^2$/g specific surface area) and H mordenite.

EXAMPLE 22

A catalyst according to Example 6 is subsequently impregnated with $KVO_3$ solution instead of vanadyl oxalate.

EXAMPLE 23

A ceramic honeycomb body, as described in Example 3, is coated with an aqueous suspension including $TiO_2$ (as anatase, specific surface area 93 m$^2$/g) and $SiO_2$ (specific surface area 263 m$^2$/g). After drying at 120° C. and two hours tempering at 450° C., the coated monolith was impregnated with a $Pt(NH_3)_4(OH)_2$ solution. Following drying at 150° C., tempering on exposure to air occurred at 300° C. After coating with the vanadyl oxalate solution and drying at 120° C., as well as subsequent vanadyl salt decomposition at 400° C., the catalyst precursor was reduced in a forming gas current, 2 h at 500° C.

The $SO_2$ conversion of the catalyst was determined using the stationary motor test unit at various temperatures according to the methodology described in Example 2. As can be seen from the graphic representation of the measurement data shown in FIG. 1, in this example it is not possible to detect any significant conversion to $SO_2$ to $SO_3$ of until the exhaust gas temperature reaches 325° C. If a catalyst according to Example 6 (support being $\gamma$-$Al_2O_3$) or Example 19 (support being 20% by weight $Al_2O_3$, 80% by weight $TiO_2$) is compared to Example 23, a somewhat higher $SO_2$ conversion is found in both these instances for the range between 175 and 325° C.

Further analysis indicated that the increased conversion observed in this temperature range can be explained by the absorption of $SO_2$ at the amphoteric support $Al_2O_3$ and subsequent oxidation of absorbed $SO_2$ to $SO_3$ on the support; however, applicants do not wish to be bound by any particular theory of operation. Thus, $SO_3$ is applied to the catalyst. If temperature peaks occur, i.e., temperatures exceed 325° C., the catalyst may emit an undesirable sulfuric acid mist.

Since the acid oxides $TiO_2$ and $SiO_2$ do not allow any significant absorption of $SO_2$ and only store $SO_3$ in minor amounts, these acid supports are preferred for the application.

EXAMPLE 24

A catalyst according to Example 23 is produced exclusively with $TiO_2$ (as anatase, specific surface area 93 m$^2$/g) as support.

EXAMPLE 25

A catalyst according to Example 6 is produced with $TiO_2$ (as anatase, specific surface area 93 m$^2$/g) and yttrium-stabilized $ZrO_2$ (specific surface area 161 m$^2$/g). During an industrial application test according to Example 23, a similar $SO_2$ conversion curve as for the mixture $TiO_2$/$SiO_2$ was found, and the advantageous effect of the acid oxide $ZrO_2$ became apparent, as well.

EXAMPLE 26

A catalyst was prepared according to Example 23 with pyrogenic $TiO_2$ (such as Degussa P25, a mixture of rutile and anatase, 51 m$^2$/g specific surface area) as activity enhancing support material.

EXAMPLE 27

A catalyst was prepared according to Example 23 with a mixture of titanium oxide consisting of 30% pyrogenic $TiO_2$ (such as Degussa P25) and 70% $TiO_2$ (anatase with a specific surface area of 105 m²/g, obtained by precipitation method).

EXAMPLE 28

A catalyst was prepared according to Example 23 with $TiO_2$ (rutile, 8 m²/g). Contrary to the other $TiO_2$-containing catalysts (Examples 24, 26 and 27), the washcoat adhesion was not sufficient in this catalyst. Furthermore, the catalytic activity of this catalyst was inferior.

REFERENCE EXAMPLE 4

A catalyst was prepared according to Example 27 without introducing a vanadium compound. This reference example shows the detrimental effect of a high sulfur dioxide conversion to sulfur trioxide when vanadium compounds are not used in the $TiO_2$-based catalysts.

TABLE 1

Catalytic composition of Examples 3-28

| Example | Noble metal | Noble-metal content g/dm³ | Carrier material g/dm³ | | $V_2O_5$ |
|---|---|---|---|---|---|
| | | | $Al_2O_3$ | other oxides | |
| 3 | Pt | 0.35 | 60 | — | 1 |
| 4 | Pt | 0.35 | 200 | — | 10 |
| 5 | Pt | 1 | 60 | — | 5 |
| 6 | Pt | 1.75 | 140 | — | 5 |
| 2 (ref.) | Pt | 1.75 | 140 | — | — |
| 7 | Pt | 2.83 | 60 | — | 1 |
| 8 | Pt | 2.83 | 200 | — | 10 |
| 9 | Pt | 1.75 | 140 | — | 5 |
| 10 | Pt:Pd = 2:1 | 1.5 | 140 | — | 5 |
| 3 (ref.) | Pt:Pd = 2:1 | 1.5 | 140 | — | — |
| 11 | Pt:Pd = 1:3 | 1.5 | 140 | — | 5 |
| 12 | Pd | 1.5 | 140 | — | 5 |
| 13 | Pd:Ir = 5:1 | 1.5 | 140 | — | 5 |
| 14 | Pt:Rh = 5:1 | 1.6 | 140 | — | 5 |
| 15 | Pt:Ir = 5:1 | 1.75 | 140 | — | 5 |
| 16 | Pt | 1.75 | 126 | 14 $TiO_2$ | 5 |
| 17 | Pt | 1.75 | 112 | 28 $TiO_2$ | 5 |
| 18 | Pt | 1.75 | 84 | 56 $TiO_2$ | 5 |
| 19 | Pt | 1.75 | 28 | 112 $TiO_2$ | 5 |
| 20 | Pd | 1.5 | 60 | 80 $SiO_2$ | 5 |
| 21 | Pt | 1.75 | 70 | 70 mordenite | 5 |
| 22 | Pt | 1.75 | 140 | — | 5 (from $KVO_3$) |
| 23 | Pt | 1.75 | — | 84 $TiO_2$ 56 $SiO_2$ | 8 |
| 24 | Pt | 1.75 | — | 140 $TiO_2$ | 5 |
| 25 | Pt | 1.75 | — | 70 $TiO_2$ 70 $ZrO_2$ | 5 |
| 26 | Pt | 1.75 | — | 140 $TiO_2$ | 5 |
| 27 | Pt | 1.75 | — | 140 $TiO_2$ | 5 |
| 28 | Pt | 1.75 | — | 140 $TiO_2$ | 5 |
| 4 (ref.) | Pt | 1.75 | — | 140 $TiO_2$ | — |

TABLE 2

Conversion of the catalysts of Examples 3-28 in the fresh state

| Example | $T_{50\%}$ (°C.) CO | $T_{50\%}$ (°C.) HC | Conversion 350° C. CO | Conversion 350° C. HC | $SO_2$ (%) 350° C. | $SO_2$ (%) 450° C. | NO* (%) 350° C. |
|---|---|---|---|---|---|---|---|
| 3 | 239 | 245 | 92 | 69 | 2 | 24 | not documented |
| 4 | 250 | 255 | 91 | 68 | 4 | 7 | not documented |
| 5 | 236 | 240 | 91 | 75 | 4 | 25 | not documented |
| 6 | 225 | 227 | 91 | 79 | 10 | 20 | 1 |
| 2 (ref.) | 223 | 227 | 92 | 78 | 60 | 68 | 8 |
| 7 | 214 | 218 | 91 | 84 | 28 | 48 | not documented |
| 8 | 213 | 222 | 91 | 84 | 16 | 33 | not documented |
| 9 | 230 | 232 | 91 | 78 | 9 | 19 | not documented |
| 10 | 238 | 242 | 90 | 71 | 15 | 28 | 2 |
| 3 (ref.) | 235 | 245 | 89 | 70 | 55 | 63 | 6 |
| 11 | 242 | 248 | 88 | 68 | 16 | 24 | 1 |
| 12 | 260 | 275 | 85 | 67 | 8 | 17 | 0 |
| 13 | 251 | 257 | 87 | 69 | 12 | 12 | 0 |
| 14 | 240 | 244 | 91 | 72 | 13 | 22 | 1 |
| 15 | 229 | 240 | 90 | 80 | 11 | 22 | 1 |
| 16 | 227 | 233 | 91 | 81 | 14 | 25 | 2 |
| 17 | 222 | 224 | 91 | 82 | 13 | 18 | 2 |
| 18 | 216 | 218 | 92 | 83 | 11 | 15 | 1 |
| 19 | 210 | 212 | 91 | 81 | 7 | 9 | 1 |
| 20 | 255 | 272 | 85 | 69 | 7 | 19 | 0 |
| 21 | 230 | 233 | 90 | 74 | 8 | 22 | 1 |
| 22 | 232 | 236 | 89 | 74 | 10 | 24 | 2 |
| 23 | 215 | 219 | 90 | 79 | 8 | 15 | 0 |
| 24 | 220 | 224 | 88 | 74 | 7 | 13 | 1 |
| 25 | 223 | 227 | 91 | 78 | 9 | 15 | 0 |
| 26 | 222 | 227 | 90 | 76 | 8 | 17 | 1 |
| 27 | 217 | 224 | 91 | 78 | 8 | 18 | 1 |
| 28 | 252 | 261 | 62 | 53 | 4 | 11 | 0 |
| 4 (ref.) | 221 | 228 | 90 | 77 | 41 | 65 | 8 |

*The determination of the conversion rates NO + $1/2O_2 \rightarrow NO_2$ took place indirectly via the measurement of the concentration of $NO_x$ and NO in the exhaust-gas current after the catalyst by means of the difference expressed as follows:

$$\frac{C_{NOx} - C_{NO}}{C_{NOx}} \cdot 100 = x\% \text{ NO}$$

TABLE 3

Conversion of a few catalysts after 100 h engine endurance test at 550° C. exhaust-gas temperature

| Example | $CO_{50\%}$ °C. | $HC_{50\%}$ °C. | $CO_{max}$ % | $HC_{max}$ % | $SO_2$ (%) 350° C. | $SO_2$ (%) 450° C. |
|---|---|---|---|---|---|---|
| 6 | 229 | 230 | 92 | 76 | 2 | 16 |
| 2 (ref.) | 225 | 228 | 91 | 75 | 58 | 63 |
| 10 | 240 | 255 | 85 | 71 | 0 | 11 |
| 3 (ref.) | 245 | 260 | 82 | 70 | 32 | 60 |
| 11 | 275 | 302 | 55 | 43 | 3 | 17 |
| 12 | 280 | 305 | 53 | 40 | 7 | 20 |
| 14 | 233 | 239 | 91 | 74 | 1 | 16 |
| 16 | 234 | 240 | 90 | 76 | 0 | 13 |
| 17 | 236 | 242 | 91 | 77 | 0 | 11 |
| 18 | 233 | 240 | 91 | 78 | 0 | 5 |
| 19 | 235 | 241 | 91 | 76 | 0 | 0 |

Further variations and modifications of the foregoing will be apparent to those skilled in the art and are intended to be encompassed by the claims appended hereto.

German priority application P 39 40 758.6 is relied on and incorporated herein.

We claim:

1. A catalyst capable of operating in a continuous manner without soot particulate separation and without cyclical regeneration for the oxidative purification of the exhaust gases of diesel engines and having a high conversion performance for hydrocarbons and carbon monoxide at low temperatures and inhibited oxidation action in respect of NO and $SO_2$ comprising:

an open-cell monolithic or honeycombed inert carrier of ceramic or metal, said inert carrier having a plurality of channels essentially parallel to the direction of flow of said exhaust gases, such that exhaust gas flows freely through the channels of the carrier, said channels having interior surfaces coated with an activity-enhancing support material selected from the group consisting of finely divided aluminum oxide, titanium oxide, silicon oxide, zeolite and mixtures thereof, said activity-enhancing support material having deposited thereon a catalytically active component of at least one platinum group metal selected from the group consisting of platinum, palladium, rhodium and iridium, the platinum group metal or metals being doped with vanadium or being in contact with an oxidic vanadium compound, said catalyst being prepared by impregnating said activity-enhancing support material with a solution of compounds of said platinum group metals and a solution of a vanadium compound, said impregnating taking place simultaneously or successively in any desired sequence, thereafter drying, optionally calcining at a temperature of at least 200° C.

2. The catalyst according to claim 1, characterized in that the activity-enhancing support material includes a mixture of aluminum oxide with titanium oxide, silica and/or zeolite in a weight ratio between aluminum oxide and the other oxides of 90:10 to 10:90, thereby providing a finely divided support material.

3. The catalyst according to claim 1, characterized in that the activity-enhancing support material is present in a concentration in the range of 30–250 $g/dm^3$ catalyst volume, the vanadium, calculated as $V_2O_5$, is present in a concentration in the range of 0.15–15 $g/dm^3$ catalyst volume and the platinum group metals are present in a concentration in the range of 0.1–7 $g/dm^3$ catalyst volume.

4. The catalyst according to claim 3 wherein the activity-enhancing support material is present in a concentration the range 75–180 $g/dm^3$ catalyst volume.

5. The catalyst according to claim 3 wherein the activity-enhancing support material is present in a concentration the range of 90–150 $g/dm^3$ catalyst volume.

6. The catalyst according to claim 1, characterized in that the cell density of the monolithic or honeycombed inert carrier is 5 to 100 $cells/cm^2$.

7. The catalyst according to claim 1, characterized in that platinum and/or palladium is present as said platinum group metal.

8. The catalyst according to claim 1, wherein during calcining the catalyst is subjected to a current of gas containing hydrogen.

9. The catalyst according to claim 1, wherein said activity-enhancing support material includes an additional material selected from the group consisting of MgO, $CeO_2$, $GeO_2$, $ZrO_2$, $HfO_2$, $ThO_2$, $Nb_2O_5$, $WO_3$, $MoO_3$, magnesium silicate, aluminum silicate, magnesium titanate, and mixtures thereof.

10. The catalyst according to claim 2, wherein said activity-enhancing support material includes an additional material selected from the group consisting of MgO, $CeO_2$, $GeO_2$, $ZrO_2$, $HfO_2$, $ThO_2$, $Nb_2O_5$, $WO_3$, $MoO_3$, magnesium silicate, aluminum silicate, magnesium titanate, and mixtures thereof.

11. The catalyst according to claim 6, wherein said activity-enhancing support material includes an additional material selected from the group consisting of MgO, $CeO_2$, $GeO_2$, $ZrO_2$, $HfO_2$, $ThO_2$, $Nb_2O_5$, $WO_3$, $MoO_3$, magnesium silicate, aluminum silicate, magnesium titanate, and mixtures thereof.

12. The catalyst according to claim 1, wherein said activity-enhancing support material includes a finely dispersed support of titanium oxide.

13. The catalyst according to claim 1, wherein said activity-enhancing support material includes a finely dispersed support of a mixture of titanium oxide with silicon dioxide in weight ratio ranging from 95 to 5:5 to 95.

14. The catalyst according to claim 13, wherein the weight ratio of titanium dioxide with silicon dioxide is in the range of 75 to 25:25 to 75.

15. The catalyst according to claim 1, wherein said activity-enhancing support material includes a finely dispersed support of a mixture of titanium oxide with zirconium dioxide in weight ratio ranging from 95 to 5:5 to 95.

16. The catalyst according to claim 15, wherein the weight ratio of titanium dioxide to zirconium dioxide is in the range of 75 to 25:25 to 75.

17. A method of making a catalyst capable of operating in a continuous manner without soot particulate separation and without cyclical regeneration and suitable for the oxidative purification of the exhaust gases of diesel engines, comprising the steps of:

impregnating an activity-enhancing support material with a vanadium compound and at least one platinum group metal, said support material being selected from the group consisting of finely divided aluminum oxide, titanium oxide, silica, zeolite and mixtures thereof, and said impregnation being made with a solution of at least one compound including the platinum group or metals and a solution of a vanadium compound, said impregnating taking place simultaneously or successively in any desired sequence;

drying the impregnated support material; and optionally calcining at a temperature of at least 200° C., and wherein said impregnating with at least one of said vanadium compound and said platinum group metal takes place after depositing said activity-enhancing support material onto an open-celled monolithic or honeycombed inert carrier, said open celled carrier allowing exhaust gas to flow freely through the cells thereof.

18. The method according to claim 17 which further comprises calcining in a current of gas containing hydrogen.

19. The catalyst according to claim 1, wherein the impregnating of the activity-enhancing support material with at least one of said vanadium compound or said platinum group metal compound takes place after depositing said activity-enhancing support material on said inert carrier.

20. The catalyst according to claim 1, wherein the impregnating of the activity-enhancing support material with at least one of said vanadium compound or said platinum group metal compound takes place before depositing said activity-enhancing support material on said inert carrier.

21. A method of making a catalyst capable of operating in a continuous manner without soot particulate separation and without cyclical regeneration and suitable for the oxidative purification of the exhaust gases of diesel engines, comprising the steps of:

impregnating an activity-enhancing support material with a vanadium compound and at least one platinum group metal, said support material being selected from the group consisting of finely divided aluminum oxide, titanium oxide, silica, zeolite and mixtures thereof, and said impregnation being made with a solution of at least one compound including the platinum group metal or metals and a solution of a vanadium compound, said impregnating taking place simultaneously or successively in any desired sequence;

drying the impregnated support material; and optionally calcining at a temperature of at least 200° C., and wherein said impregnating with at least one of said vanadium compound and said platinum group metal takes place before depositing said activity-enhancing support material onto an open-celled monolithic or honeycombed inert carrier, said open-celled carrier allowing exhaust gas to flow freely through the cells thereof.

22. The method according to claim 21, which further comprises calcining in a current of gas containing hydrogen.